United States Patent [19]
Freeman

[11] Patent Number: 5,682,196
[45] Date of Patent: Oct. 28, 1997

[54] THREE-DIMENSIONAL (3D) VIDEO PRESENTATION SYSTEM PROVIDING INTERACTIVE 3D PRESENTATION WITH PERSONALIZED AUDIO RESPONSES FOR MULTIPLE VIEWERS

[75] Inventor: Michael J. Freeman, Kings Point, N.Y.

[73] Assignee: ACTV, Inc., New York, N.Y.

[21] Appl. No.: 493,845

[22] Filed: Jun. 22, 1995

[51] Int. Cl.[6] .............................. H04N 7/14; H04N 7/173
[52] U.S. Cl. .................. 348/13; 348/14; 348/15; 348/70; 348/36; 348/19; 348/39; 395/119; 395/155
[58] Field of Search .................. 348/12, 13, 14, 348/19, 20, 40, 42, 39, 36, 38, 51; 395/118, 119, 155, 161; 273/438; H04N 7/14, 7/173

[56] References Cited

U.S. PATENT DOCUMENTS

| | | |
|---|---|---|
| Re. 32,776 | 11/1988 | Saylor . |
| Re. 34,340 | 8/1993 | Freeman . |
| 2,612,533 | 9/1952 | Homrighous . |
| 2,777,901 | 1/1957 | Dostert . |
| 2,826,828 | 3/1958 | Hamilton . |
| 2,908,767 | 10/1959 | Fritzinger . |
| 2,921,385 | 1/1960 | Hamilton . |
| 3,008,000 | 11/1961 | Morchand . |
| 3,020,360 | 2/1962 | Gratian et al. . |
| 3,194,895 | 7/1965 | Treadwell . |

(List continued on next page.)

FOREIGN PATENT DOCUMENTS

| | | |
|---|---|---|
| 16314 | 10/1980 | European Pat. Off. . |
| 128481 | 12/1984 | European Pat. Off. . |
| 314572 | 5/1989 | European Pat. Off. ......... H04N 7/16 |
| 994233 | 6/1965 | Germany . |
| 4207885 | 7/1992 | Japan . |
| 6165170 | 6/1994 | Japan . |
| 8102961 | 10/1981 | WIPO . |
| 9403851 | 2/1994 | WIPO . |

OTHER PUBLICATIONS

Tsuruta et al., A Knowledge Based Interactive Train Scheduling System Aiming at Large Scale Complex Planning Expert Systems, International Workshop on Artificial Intelligence for Industrial Applications, 1988, pp. 490–495.

Dawson, Compression on the Fast Track, Cablevision, Apr. 22, 1991, pp. 22–30.

(List continued on next page.)

*Primary Examiner*—Glenton B. Burgess
*Attorney, Agent, or Firm*—Dorsey & Whitney LLP

[57] ABSTRACT

The system of the present invention provides actual interactive choices to members of an audience in the form of three dimensional (3D) objects in space, and after each member of the audience reaches out at, points at, or looks at the 3D object of choice, the system responds and alters the audio and/or video feedback to each member. Specifically, a 3D video production is presented on a screen and at several points during the presentation a character or person, appearing on the screen, requests each user to respond to a question by physically selecting one of several possible 3D objects, the 3D objects appearing through the 3D effect to be floating directly in front of each user. The 3D answer options could be three 3D characters, for example. Selection of one of these objects is facilitated through a unique user interface unit, embodied in either a helmet, gun, or wand configuration. Each of these alternative user interface units allow the interactive selection to be made by physical gestures. The user interface unit is comprised of a detection device, a processor and associated circuitry, and attached headphones. Immediately upon making a selection, the user interface unit determines the choice made by the user, matches the choice with a distinct prerecorded audio feedback response, and presents to the user a distinct and individualized audio response. These personalized feedback responses are seamlessly communicated to each user through a set of headphones, and thus, amount to minimally perceived alterations from the common audio presentation. Interactive realism is enhanced through the preferred lip synching of the audio feedback response to the video character's mouth movements.

11 Claims, 4 Drawing Sheets

U.S. PATENT DOCUMENTS

| | | |
|---|---|---|
| 3,221,098 | 11/1965 | Feldman et al. . |
| 3,245,157 | 4/1966 | Laviana . |
| 3,255,536 | 6/1966 | Livingston . |
| 3,273,260 | 9/1966 | Walker . |
| 3,284,923 | 11/1966 | Leslie . |
| 3,343,280 | 9/1967 | Tolnai . |
| 3,366,731 | 1/1968 | Wallerstein . |
| 3,387,084 | 6/1968 | Hine et al. . |
| 3,440,342 | 4/1969 | Beltrami . |
| 3,477,144 | 11/1969 | Stillit . |
| 3,484,950 | 12/1969 | Serrell et al. . |
| 3,485,946 | 12/1969 | Jackson et al. . |
| 3,538,621 | 11/1970 | Mayeda . |
| 3,546,791 | 12/1970 | Koos et al. . |
| 3,566,482 | 3/1971 | Morchand . |
| 3,575,861 | 4/1971 | Flossmoor, III . |
| 3,602,582 | 8/1971 | Torricelli . |
| 3,623,238 | 11/1971 | Laplume et al. . |
| 3,665,615 | 5/1972 | Laplume . |
| 3,708,891 | 1/1973 | Rosov . |
| 3,725,571 | 4/1973 | Justice . |
| 3,730,980 | 5/1973 | Kirk, Jr. . |
| 3,757,225 | 9/1973 | Ulicki . |
| 3,763,577 | 10/1973 | Goodson . |
| 3,774,316 | 11/1973 | Maier . |
| 3,814,841 | 6/1974 | Ulicki . |
| 3,825,674 | 7/1974 | Justice . |
| 3,833,760 | 9/1974 | Tickle . |
| 3,849,594 | 11/1974 | Justice . |
| 3,857,999 | 12/1974 | Justice . |
| 3,860,745 | 1/1975 | Takada . |
| 3,902,007 | 8/1975 | Justice . |
| 3,916,092 | 10/1975 | Justice . |
| 3,936,595 | 2/1976 | Yanagimachi et al. . |
| 3,947,972 | 4/1976 | Freeman . |
| 3,988,528 | 10/1976 | Yanagimachi et al. . |
| 3,991,266 | 11/1976 | Baer . |
| 4,034,990 | 7/1977 | Baer . |
| 4,040,088 | 8/1977 | Hannan . |
| 4,044,380 | 8/1977 | Justice et al. . |
| 4,078,316 | 3/1978 | Freeman . |
| 4,199,781 | 4/1980 | Doumit ................................. 358/83 |
| 4,245,245 | 1/1981 | Matsumoto et al. . |
| 4,264,924 | 4/1981 | Freeman . |
| 4,264,925 | 4/1981 | Freeman et al. . |
| 4,290,142 | 9/1981 | Schnee et al. . |
| 4,292,649 | 9/1981 | Macheboeuf . |
| 4,305,131 | 12/1981 | Best . |
| 4,331,974 | 5/1982 | Cogswell et al. . |
| 4,333,152 | 6/1982 | Best . |
| 4,361,730 | 11/1982 | Barber et al. . |
| 4,381,522 | 4/1983 | Lambert . |
| 4,399,329 | 8/1983 | Wharton ................................. 179/1 |
| 4,422,105 | 12/1983 | Rodesch et al. . |
| 4,439,784 | 3/1984 | Furukawa et al. . |
| 4,445,137 | 4/1984 | Panofsky . |
| 4,445,187 | 4/1984 | Best . |
| 4,507,680 | 3/1985 | Freeman . |
| 4,516,156 | 5/1985 | Fabris et al. . |
| 4,530,008 | 7/1985 | McVoy . |
| 4,536,791 | 8/1985 | Campbell et al. . |
| 4,546,382 | 10/1985 | McKenna et al. . |
| 4,555,730 | 11/1985 | Briggs . |
| 4,569,026 | 2/1986 | Best . |
| 4,571,640 | 2/1986 | Baer . |
| 4,573,072 | 2/1986 | Freeman . |
| 4,574,305 | 3/1986 | Campbell et al. . |
| 4,591,248 | 5/1986 | Freeman . |
| 4,599,611 | 7/1986 | Bowker et al. . |
| 4,602,279 | 7/1986 | Freeman . |
| 4,616,261 | 10/1986 | Crawford et al. . |
| 4,635,132 | 1/1987 | Nakamura . |
| 4,644,515 | 2/1987 | Allebest et al. . |
| 4,647,980 | 3/1987 | Steventon et al. . |
| 4,665,431 | 5/1987 | Cooper ................................. 358/145 |
| 4,694,490 | 9/1987 | Harvey et al. . |
| 4,701,896 | 10/1987 | Allebest et al. . |
| 4,704,725 | 11/1987 | Harvey et al. . |
| 4,733,301 | 3/1988 | Wright, Jr. . |
| 4,734,764 | 3/1988 | Pocock et al. . |
| 4,750,036 | 6/1988 | Martinez . |
| 4,763,317 | 8/1988 | Lehman et al. . |
| 4,768,087 | 8/1988 | Taub et al. ................................. 358/84 |
| 4,777,529 | 10/1988 | Schultz et al. . |
| 4,780,757 | 10/1988 | Bryer et al. . |
| 4,780,758 | 10/1988 | Lin et al. . |
| 4,785,349 | 11/1988 | Keith et al. . |
| 4,786,967 | 11/1988 | Smith, III et al. . |
| 4,807,031 | 2/1989 | Broughton et al. . |
| 4,816,905 | 3/1989 | Tweedy et al. . |
| 4,821,101 | 4/1989 | Short . |
| 4,839,743 | 6/1989 | Best et al. . |
| 4,846,693 | 7/1989 | Baer . |
| 4,847,690 | 7/1989 | Perkins . |
| 4,847,698 | 7/1989 | Freeman . |
| 4,847,699 | 7/1989 | Freeman . |
| 4,847,700 | 7/1989 | Freeman . |
| 4,855,827 | 8/1989 | Best . |
| 4,862,268 | 8/1989 | Campbell et al. . |
| 4,870,591 | 9/1989 | Cicciarelli et al. ................................. 364/468 |
| 4,875,096 | 10/1989 | Baer et al. . |
| 4,876,592 | 10/1989 | Von Kohorn . |
| 4,884,974 | 12/1989 | DeSmet . |
| 4,894,789 | 1/1990 | Yee . |
| 4,905,094 | 2/1990 | Pocock et al. . |
| 4,916,633 | 4/1990 | Tychonievich et al. ................................. 364/513 |
| 4,918,516 | 4/1990 | Freeman . |
| 4,918,620 | 4/1990 | Ulug ................................. 364/513 |
| 4,924,303 | 5/1990 | Brandon et al. . |
| 4,926,255 | 5/1990 | Von Kohorn . |
| 4,930,019 | 5/1990 | Chu . |
| 4,941,040 | 7/1990 | Pocock et al. ................................. 358/86 |
| 4,949,170 | 8/1990 | Yanagidaira et al. . |
| 4,965,825 | 10/1990 | Harvey et al. . |
| 4,967,368 | 10/1990 | Bolling et al. ................................. 364/513 |
| 4,972,328 | 11/1990 | Wu et al. ................................. 364/513 |
| 4,975,771 | 12/1990 | Kassatly . |
| 4,987,486 | 1/1991 | Johnson et al. . |
| 4,988,111 | 1/1991 | Gerlizt et al. . |
| 4,989,233 | 1/1991 | Schakowsky et al. . |
| 4,989,234 | 1/1991 | Schakowsky et al. . |
| 4,991,011 | 2/1991 | Johnson et al. . |
| 4,994,908 | 2/1991 | Kuban et al. . |
| 5,001,554 | 3/1991 | Johnson et al. . |
| 5,010,400 | 4/1991 | Oto . |
| 5,010,500 | 4/1991 | Makkuni et al. . |
| 5,014,125 | 5/1991 | Pocock et al. . |
| 5,023,707 | 6/1991 | Briggs . |
| 5,034,807 | 7/1991 | Von Kohorn . |
| 5,043,891 | 8/1991 | Goldstein et al. ................................. 364/419 |
| 5,051,822 | 9/1991 | Rhoades . |
| 5,053,883 | 10/1991 | Johnson . |
| 5,055,924 | 10/1991 | Skutta . |
| 5,057,915 | 10/1991 | Von Kohorn . |
| 5,077,607 | 12/1991 | Johnson et al. . |
| 5,090,708 | 2/1992 | Gerlitz et al. . |
| 5,093,718 | 3/1992 | Hoarty et al. . |
| 5,109,414 | 4/1992 | Harvey et al. . |
| 5,132,992 | 7/1992 | Yurt . |
| 5,133,079 | 7/1992 | Ballantyne et al. . |
| 5,157,491 | 10/1992 | Kassatly . |
| 5,174,759 | 12/1992 | Preston et al. . |

| | | |
|---|---|---|
| 5,176,520 | 1/1993 | Hamilton . |
| 5,177,604 | 1/1993 | Martinez . |
| 5,181,107 | 1/1993 | Rhoades . |
| 5,210,611 | 5/1993 | Yee et al. ............................... 358/191 |
| 5,220,420 | 6/1993 | Hoarty et al. . |
| 5,227,874 | 7/1993 | Von Kohorn . |
| 5,236,199 | 8/1993 | Thompson, Jr. . |
| 5,239,463 | 8/1993 | Blair et al. ............................. 364/410 |
| 5,239,617 | 8/1993 | Gardner et al. .......................... 395/12 |
| 5,247,347 | 9/1993 | Litteral et al. . |
| 5,318,450 | 6/1994 | Carver . |
| 5,340,317 | 8/1994 | Freeman .................................. 434/331 |
| 5,404,393 | 4/1995 | Remillard ................................. 379/96 |
| 5,405,152 | 4/1995 | Katanics et al. ........................ 273/438 |
| 5,442,389 | 8/1995 | Blahut et al. .............................. 348/7 |
| 5,488,411 | 1/1996 | Lewis et al. ............................... 348/8 |
| 5,526,478 | 6/1996 | Russell, Jr. et al. .................... 395/154 |
| 5,537,141 | 7/1996 | Harper et al. ............................ 348/12 |
| 5,594,492 | 1/1997 | O'Callaghan et al. .................. 348/10 |
| 5,594,935 | 1/1997 | Reber et al. ................................ 455/2 |

OTHER PUBLICATIONS

Martial et al., An Interactive Planner for Open Systems, Proceedings of the 4th Conference on Artificial Intelligence, Mar. 1988, pp. 293–298.

Gault, Turning Cold Box Into Interactive TV, Crain's New York Business, Jul. 15, 1991, p. 17.

Campbell, Optimal Decision Making in a Business Simulation, System Sciences, 1989 Annual Hawaii International Conference, vol. III, pp. 822–831.

Gilder, Now or Never, Forbes, Oct. 14, 1991, pp. 188–198.

Kim, First All–Digital HDTV Developed by Video Cipher, Multichannel News, Jun. 11, 1990, p. 35.

Kim, ATC: Technical Tidal Wave to Engulf Cable Industry, Multichannel News, Aug. 13, 1990, pp. 33–34.

Kim, Jerrold Offers Cable Digital Compression, Multichannel News, Mar. 11, 1991, p. 6.

Will it Revolutionize HDTV?, Jun. 4, 1990, pp. 33–34.

Video Storage In Digital Transmission, Specs Technology, Cable Television Laboratories, vol. 3, No. 7, Sep. 1991, pp. 1–6.

Harless, et al., "Interactive Videodisc Case Studies for Medical Education", 10th Ann. Symp. Computer Applications in Medical Care (Oct. 1986) Bock, Videodisk Standards: A Software View of the Technology, 8012 S.M.P.T.E. Journal, vol. 92 (1983).

Kim, Test Equipment for Digital Still a Puzzle, Multichannel News, May 27, 1991, p. 24.

Powell, Digitizing TV Into Obsolescence, New York Times, Oct. 20, 1991.

Waters et al., Talking Back to the Tube, Newsweek, Dec. 3, 1990, pp. 56–57.

THREE-DIMENSIONAL (3D) VIDEO PRESENTATION SYSTEM PROVIDING INTERACTIVE 3D PRESENTATION WITH PERSONALIZED AUDIO RESPONSES FOR MULTIPLE VIEWERS

BACKGROUND OF THE INVENTION

Interactive video and audio presentation systems are currently being introduced into the entertainment and educational industries. A prominent interactive technology that has been applied successfully in these industries is based on providing interactivity in a one-way system through the provision of multiple parallel channels of information. For example, commonly owned Freeman et al. patents, U.S. Pat. Nos. 4,264,925 and 4,264,924, which provide both audio and video interactivity, disclose interactive television systems where switching among multiple broadcast or cable channels based on viewer selections provides an interactive capability.

These systems have been enhanced to include memory functions using computer logic and memory, where selection of system responses played to the viewer are based on the processing and storage of subscriber responses, as disclosed in Freeman patent, U.S. Pat. No. 4,507,680.

The benefits of providing interactivity through the use of different audio responses is disclosed in Freeman, U.S. Pat. Nos. 4,847,698, 4,847,699 and 4,847,700. These television systems provide a common video signal accompanied by several synchronized audio channels to provide content related user selectable responses. The audio signals produce different audio responses, and in some cases, these are syllable synched to a first audio script and to the video signal (such as to a person or character on a display), providing the perception that the person's or character's mouth movements match the spoken words.

Interactivity is brought to the classroom in the Freeman U.S. patent application Ser. No. 08/228,355. The distance learning system claimed in this application enhances the classroom educational experience through an innovative use of interactive technology over transmission independent media. When an instructor, either broadcast live on video or displayed from videotape, asks a question, each and every student responds, preferably by entering a response on a remote handset, and each student immediately receives a distinct and substantive audio response to his or her unique selection. The individualization of audio response from the interactive program is a major aspect of the invention.

Individualization of audio is brought to the home based on the technology disclosed in Freeman U.S. patent application Ser. No. 08/289,499. This system provides a program that can be watched on any conventional television set or multimedia computer as a normal program. But if the viewer has a special interactive program box connected to the television, or a program board inserted into their multimedia personal computer, he or she can experience a fully functional interactive program. Each interactive viewer enjoys personalized audio responses and video graphics overlayed on the screen. The interactive program can be provided to television sets or to computers by cable, direct broadcast satellite, television broadcast or other transmission means, and can be analog or digital. Unlike previous interactive systems, this application covers a system that subtly introduces the interactive responses to the viewer throughout the program. This enhanced interactivity is provided through the use of "trigger points" spread throughout the program. Trigger points occur at designated times and result in the program content being altered to present individual attention to the particular viewer.

However, none of the previous interactive systems disclose interacting with a three dimensional video presentation. Three dimensional (3D) video imaging has been available for a long time, but developers have been unable to improve the quality of the image at an affordable cost to compete with the usual two dimensional (2D) movies or presentations. Three dimensional images may be created by several techniques, including stereoscopy, autostereoscopy, image polarization, and holographic techniques. Until now, 3D imaging techniques have never been used in an interactive system. However, 3D imaging and interactive technology are both designed to achieve similar purposes, personal interaction with the visual image. Three dimensional images are designed to give the viewer the perception they may reach out and touch the image or that they are in the same room as the image. Interactivity is designed to make the user feel involved in the program. Consequently, what is needed is the combination of these technologies to create a synergistic effect to enhance the viewers' involvement in the presentation beyond the independent benefits of 3D imaging and interactivity.

In addition, the previous interactive systems usually require user interaction through the use of some type of contact with a physical device such as a keypad, keyboard or remote control device. Such a selection mechanism does not give the user the impression they are physically interacting with the system. Therefore, what is needed is an interactive system that allows members of an audience to interact with the three dimensional objects in a 3D interactive presentation system. Thus, what is needed is a low cost system for using audio interactivity based on physical movements with the perception of full motion 3D video interactivity.

SUMMARY OF THE INVENTION

The present invention, A THREE-DIMENSIONAL (3D) VIDEO PRESENTATION SYSTEM PROVIDING INTERACTIVE 3D PRESENTATION WITH PERSONALIZED AUDIO RESPONSES FOR MULTIPLE VIEWERS, provides a vastly enhanced three dimensional video/audio presentation by allowing the viewer to actively participate in the program and by providing instantaneous audio feedback to the user. The interactive 3D video presentation provides actual interactive choices for selection in the form of three dimensional objects in space to each member of the audience, and after each member of the audience reaches out at or looks at the object of choice, the system responds and alters the audio feedback to each member.

The educational and entertainment value of almost any presentation is greatly enhanced if the viewer can physically interact with the presentation. In the present invention, the user's interaction with the presentation is maximized by combining three dimensional (3D) video, physical interactivity and personalized audio feedback. By making the viewer feel more involved, the viewers interest, enjoyment, and/or learning are all increased. Consequently, the combination of three dimensional video and interactive technologies in a novel manner creates a unique system allowing group presentations to appeal individually to each viewer.

With the current invention, a large number of viewers watch a common 3D video presentation on a large screen (e.g., a movie theater), but each student can carry on a completely different dialogue with the interactive program. As a result, the presentation maintains the viewer's interest because the presentation is customized to address their personal expectations and choices. Further, the feeling of personal involvement is enhanced by the 3D imaging. Three dimensional (3D) imaging makes the viewer believe they are in the same room as the 3D characters on the screen and even able to reach out and touch the 3D images.

Additionally, the present invention goes further than using simple keypad selections for user response interactivity. This invention allows the communication of interactive responses from the user based on their physical movements such as merely looking at the 3D character of choice, pointing at the 3D character with a pointing device, or reaching out and touching a 3D character, which provides a much more realistic form of user involvement. A variety of user interface embodiments can be used to implement this response capability based on physical movements, including, but not limited to, such selection means as pointers, specialized helmets, etc.

In the present invention, the users watch a 3D presentation that includes one or more animated characters or people. When either a character or person prompts the user to respond to a question or instruction, one or more 3D answer options will appear in front of all the users. These 3D answer options appear to be directly "floating" in front and within arm's length of each user. The 3D answer options could be three characters, for example. As discussed above, each user then responds by either turning their head to look directly at the 3D answer option of choice, reaching out and attempting to touch the 3D character, or pointing a finger or device at the answer option of choice.

Of course, there are several other ways in which the user can respond to the query or prompt. The users interact with the 3D interactive program with a user interface unit. Preferably, the user interface unit includes a selection means, a means for determining an appropriate audio response, and attached headphones. It also contains 3D glasses or visor. Immediately upon making the choice, the selection means in each user's interface unit determines the choice made by the viewer. The interface unit processor, with the use of audio selection data codes, matches the choice with a distinct audio response selection, and either calls from memory or commands a branch to a distinct audio response. Each individual then receives a personalized audio feedback response through a set of headphones. These feedback responses are seamlessly communicated to each user, and thus, amount to minimally perceived alternations from the common audio presentation.

To enhance the realism of the interactive experience, it is preferred that each of the distinct audio feedback responses be synchronized to the person or character presented on the video screen. Thus, the feedback audio responses are prerecorded in the narrator's or character's voice and made in such a way as to match their mouth movements. One possible technique for providing a realistic lip sync is through the syllable synching technique as disclosed in U.S. Pat. Nos. 4,847,698, 4,847,699, and 4,847,700, herein incorporated by reference. As a result, regardless of which audio response is chosen, the video character's mouth moves as if the video was customized for the audio.

The 3D presentation system also has the advantage of remembering user selections and using these previous selections in choosing an audio feedback response to present to the user. This memory capability is facilitated through the use of logic and memory in conjunction with each user interface processor. This configuration allows for the storage of previous user selections and the processing of these selections to control future audio feedback.

Accordingly, a primary objective of the invention is an enhanced interactive 3D presentation system which combines the realism of 3D imaging, physical interactivity, personalized audio responses, synchronized video and audio, and seamless audio alterations.

It is an object of the invention to allow viewers to respond to on-screen character or person prompts by physically selecting a 3D answer option, such as looking at or pointing at the 3D image of interest, to indicate the user's responses to the 3D images.

It is an object of the invention to remember earlier selections in order to use this information in formulating future audio responses.

These and other advantages, features, and objectives of the invention and the manner of attaining them will become apparent and the invention will be best understood by reference to the following description of the embodiments of the invention in conjunction with the accompanying drawings and appended claims.

DETAILED DESCRIPTION OF THE PREFERRED EMBODIMENT

I. Introduction

The present invention is a 3D video presentation system for enabling an interactive 3D video presentation to give actual interactive choices for selection in the form of three dimensional objects in space to each member of the audience, and after each member of the audience reaches out at or looks at the object of choice, the system responds and alters the audio feedback to each member. The 3D video imaging provides the viewer the perception they are in the same room with and have the ability to physically reach out, point at or appear to touch the 3D images or characters presented on the screen.

Specifically, a 3D video production is presented in a movie theater, for example, and at several points during the presentation a person, or character, requests each user to respond to a question by either directly looking at, pointing a device at, or reaching toward, one of two or more answer options (depicted as 3D characters or objects). These 3D answer options appear to be directly in front and within arm's length of each user. Immediately after the user selects an answer, the system subtly and seamlessly alters the audio to each individual user, thereby providing a completely personalized audio feedback response. Interactive realism is enhanced through the preferred lip synching of the audio feedback response to the video character's mouth movements. The lip synched audio feedback response to one user is probably different from the response heard by several other users. In this manner, personalized audio feedback is provided to each viewer.

Currently, some interactive systems do include video and audio interactivity through the use of a keypad entry or other interface means; however, in none of these systems is the video three dimensional, the interactive selections made by physical gestures, and a realistic and enhanced presentation provided by full synchronization between all the audio responses and the video.

The interactive presentation is of a type disclosed in commonly copending U.S. patent application Ser. No. 08/228,355, filed Apr. 15, 1994 and copending U.S. patent application Ser. No. 08/289,499, filed Aug. 12, 1994, and in U.S. Pat. Nos. 4,847,698, 4,847,699, 4,847,700, 4,264,924, 4,264,925, and RE 34,340, the contents of which are incorporated by reference.

II. System Components

A. General Overview

The interactive presentation system of the present invention uses any three dimensional video imaging technique including, but not limited to, binocular stereoscopy, autostereoscopy, image polarization, or holographic techniques. In some cases, these techniques may be used in conjunction with laser generated imagery. The present invention, however, is not dependant on any particular type of three dimensional video technique and, therefore, could work well with any of the currently known or foreseeable 3D video technologies. Likewise, the medium for storage of the 3D interactive productions images can be any suitable presentation medium including CD ROM, video disc player or magnetic tape. Any of these mediums may be used in conjunction with film, light, computer and/or laser generated imagery.

Figure 1:
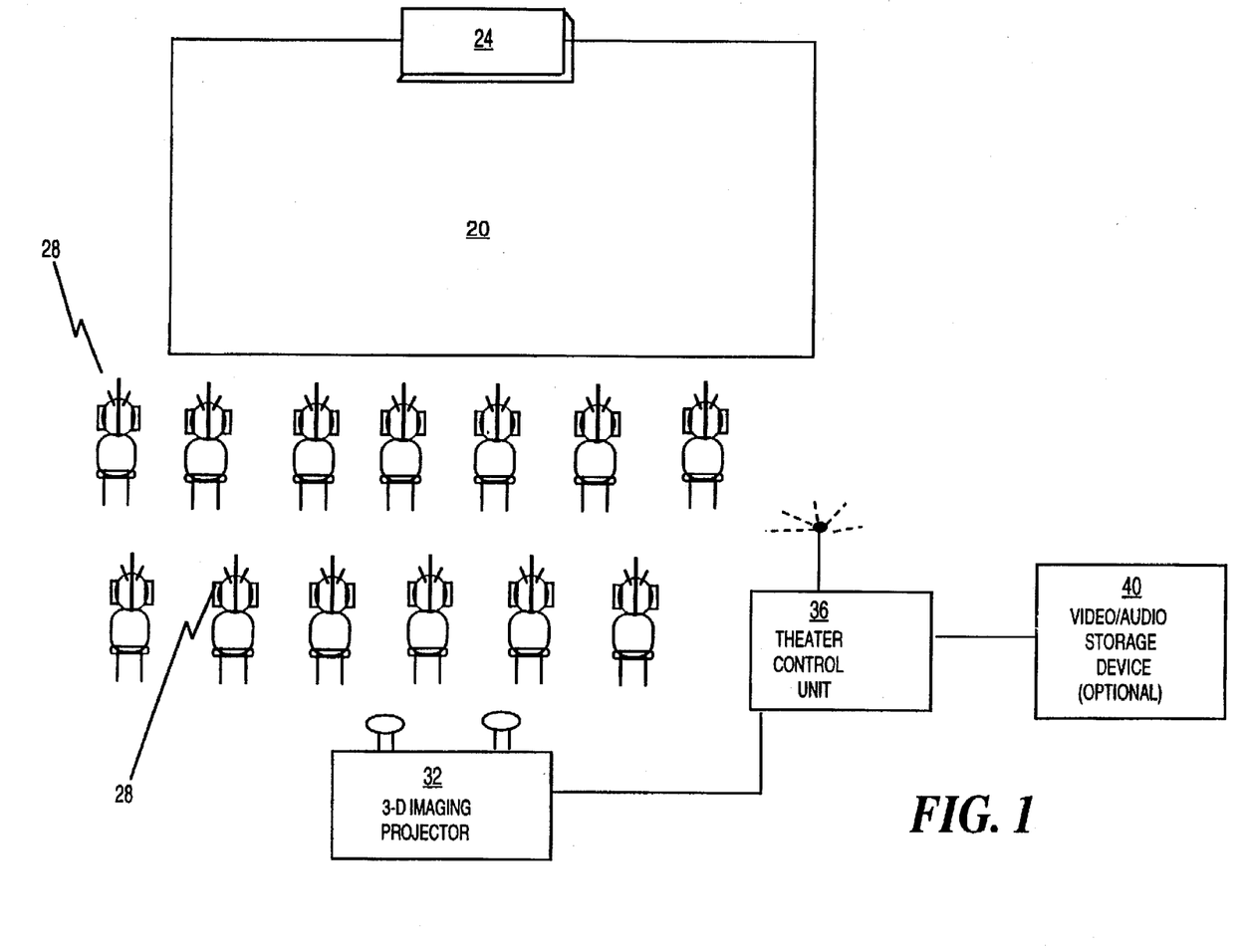
FIG. 1 is a diagrammatic representation of the 3D video presentation system displaying various elements of the system.

As shown in FIG. 1, the system makes use of a video/audio storage device 40, (a CD ROM, VCR, film, or video disc player) connected to a theater control unit 36 (a program box or PC) to deliver the common audio and individualized audio feedback segments to the user interface units 28 and the 3D video portion of the program to 3D projection equipment 32, which subsequently projects the 3D video onto a screen 20 at the front of the theater. Alternatively, the common audio could be distributed to the theater sound system. The system includes in a preferred embodiment an infrared or radio transmitter 24 located at the front of the theater for providing a reference beacon signal for aiding in the determination of the users' physical selections. The reference beacon signal is interpreted and processed by each user's interface unit 28, specifically the selection means, to indicate which of the 3D answer objects is selected by the particular user. Based on the determined user selection, the determination means of each user interface unit 28 processes this selection and with the aid of unique audio selection codes selects and presents to the particular user an individualized audio feedback response through a set of headphones 132 attached to the user interface unit 28, wherein the individualized audio feedback is preferably lip synched to the video character's or person's mouth movements.

While FIG. 1 shows a preferred embodiment of the present invention in an interactive movie theater, the present invention is not constrained to such an environment. In alternative embodiments, a conventional TV broadcast, cable television, wireless network, or satellite system could be used as the source of the 3D interactive programming in accordance with the present invention. The 3D interactive presentation could be transmitted in either digital or analog formats. For example, the 3D interactive presentation program could be packaged as described in U.S. patent application Ser. No. 08/289,499, preferably with the alternative feedback audio segments inserted into the vertical blanking interval of the 3D video program with appropriate reception equipment at the home or other reception center, as described below.

B. Production of the 3D Interactive Video Presentation

The 3D video presentation portion of the present invention may be created many ways including, but not limited to, binocular stereoscopy, autostereoscopy, image polarization, or holographic techniques. If the 3D video presentation is designed using stereoscopy, two cameras are used to record the same image. These cameras are preferably positioned around 2.5 inches (6.3 cm) apart, one representing the left eye and the other representing the right. The resulting images are simultaneously projected onto the screen by two synchronized projectors. However, the viewer sees these images as three dimensional with the assistance of tinted or polarized glasses. The glasses make the left eye image only visible to the left eye and the right eye image only visible to the right eye. As a result, the viewer actually sees the images separately, but perceives them as three dimensional because, for all practical purposes, the two slightly different images are fused together instantly by their mind. As an example of stereoscopy, the United Artist System uses interlocked 70 mm cameras and projectors to produce 3D images on a screen almost fifty feet wide. Another example is the 3D presentation system used for the Kodak Pavilion at the EPCOT Center at Disney World in Florida. This system uses interlocked 65 mm cameras and 70 mm projectors for projecting the 3D images onto a 54-by-22 foot screen.

Autostereoscopy or 3D spatial imaging can also be used to create the video portion of the 3D interactive program. Autostereoscopy uses the normal stereoscopy technique, but uses several 2D images, instead of only two images. Autostereoscopy requires several pictures from a series of angles to create more information about the images in the video. The more pictures and the smaller the difference in their angle of perspective, the higher the quality of the image.

Holograms are another method of 3D imaging that could be used with the present invention. In the past, most holograms were created by recording the complex diffraction pattern of laser light reflected from a physical object. More recent techniques are called computer generated holograms (CGH). These techniques are dependent on the fast processing speeds of computers because the complex diffraction patterns require a large number of computations with complex numbers.

Now that the various methods of producing 3D video have been briefly described, the presently preferred method of recording the 3D interactive program shall be described. The 3D presentation preferably will be designed to have a number of points therein where an interrogatory message or instruction is relayed from the actor to the members of the audience. At these points, it will be necessary to create a number of alternative audio feedback segments. These segments represent responses to be presented as a function of user selections. Preferably, the video portion of the presentation is recorded first along with the common audio and with the most likely (or correct choice) audio feedback segment. After the first recording of the program, the alternate audio feedback segments should be successively recorded by the actor on a separate appropriate audio track.

Preferably, the alternative audio feedback segments are synched (at certain times when the character is on the screen) to the mouth movements of the character or person in the common 3D video. Lip synching can be done with humans, but works best with animation, animal characters, computer or laser generated characters, etc. For example, if the viewer is told to reach out and point at a three dimensional floating boy image if they themselves are a boy, and they respond in this fashion, the on-screen character can look directly at them and say "you are a boy." The same would be true for girls in this case, except the alternative feedback audio segment replaces the word "boy" with "girl." However, lip synching is only necessary when the character is actually on the screen at the time the audio feedback responses are presented to the users.

This method of synching the audio segments to the common video is enabled by providing a similar syllable count for each of the alternative audio feedback segments as disclosed in U.S. Pat. Nos. 4,847,698, 4,847,699 and 4,847,700. In order to do this, the actor who recorded the first choice in the original program should view the replayed video on a studio monitor, for example, and wear headphones 132 in order to hear what was originally recorded. The actor then restates the same line but changes the words or phrases while watching the video. In the example stated above, both "girl" and "boy" are syllable synched to the visual mouth movements of the on-screen character. Since the spoken words "boy" and "girl" are both one syllable words, the mouth movements of the video character will be synchronized with the spoken words. In this manner, several different audio feedback segments can be created corresponding to the interrogatory message. The producer should ensure that each of the n alternative audio segments are kept near the same length in time.

With respect to the video presentation and prior to the triggering of one of the audio feedback segments, the users will be instructed by a character or narrator to select between two to more answer choices. Preferably, each of these answer choices are provided visually to the user in three dimensions and are clearly separated in space from one another. For example, one 3D image would be on the left side of the screen and another 3D image would be on the right side of the screen. These 3D characters appear to be within "touching range" of each individual viewer, but in fact are just part of the 3D effect. This provides the illusion to each individual viewer that they can simply reach out and touch these "floating" characters. Therefore, as each interrogatory message or instruction is relayed from the actor to the members of the audience, one or more 3D objects, corresponding to the possible user selections, will simultaneously appear in the video presentation. As explained below, the presentation of these 3D images will be used to elicit a selection by the users, wherein each user physically selects one of these images by either looking at, reaching at, or points a pointing device towards the 3D image, as described below.

Timing and control between the 3D video, common audio and the multiple audio feedback segments are provided through the use of data codes. The codes comprise audio selection data commands, or branch codes, for branching between a common audio channel to the multiple audio feedback segments at the appropriate branch times. The codes also comprise timing signals (for controlling the interactive elements and the branching or switching between the various audio signals to ensure frame accuracy), data or text, and indicators designating the initiation and termination of interactive program segments. The use of data codes, in effect, time stamp the relevant audio segments with predetermined times on the video signal. The data codes are preferably prepared using authoring tools and a personal computer.

The 3D presentation can also be created in such a manner where the audio feedback responses do not have to necessarily immediately follow the interrogatory question. Through the use of "trigger points," as described in copending U.S. patent application Ser. No. 08/289,499, filed Aug. 12, 1994, interactive audio can show up any time during the program as a function of stored user selection information. Trigger points provide designated times during the program when the program content is subtly altered to present individual and specialized attention to each subscriber. The trigger points are essentially markers in the program that effectively trigger macros, preferably stored in memory in each user interface unit 28, which call for a personalized audio segment to play over the user's headphones 132. The particular audio segment(s) chosen at each user interface unit 28 is based on previous user selections to questions preferably presented at the beginning of the show or in combination with a particular pattern of interactions solicited and entered during the program. Each user interface unit 28 recognizes the trigger points by decoding the data codes sent to each of the units. The exact timing of the trigger points are unknown to the subscriber in order to make the interactive elements appear unsolicited to the interactive user. Of course, timing of the interactive events should correspond to suitable times in the program where branching to interactive elements is sensible and does not clash with the program content of the 3D video shown on the screen 20.

There are several different ways in which to integrate, store and/or transmit the 3D interactive presentation. The 3D interactive program video, common audio and multiple audio feedback responses and data codes are preferably recorded for later playback in the movie theater environment in whatever format is available including tape, film, CD ROM or disk (in analog or digital form), including but not limited to: one inch, D1, D2, Betacam, Betacam SP, Hi-8, three quarter, S-VHS, or any other format. The video/audio storage device 40 can be either a video tape player (VCR), CD ROM external storage device, film or video disc player, etc., depending upon the storage medium of the 3D interactive presentation program. Alternatively, the composite 3D interactive digital or analog program can be transmitted to remote reception sites using any suitable transmission means such as satellite, TV broadcast, fiber optic, cable television, etc. If the program is to be transmitted over some transmission means, it is envisioned that at least two 6 MHz NTSC standard video signals will be required to transmit the multiple images required for a 3D presentation. If analog transmission is used, preferably the common audio and multiple alternative audio feedback signals and data codes are inserted into the vertical blanking interval of one or more of the video signals using an interactive program inserter, such as that shown in FIGS. 3 and 4 of copending U.S. patent application Ser. No. 08/228,355, filed Apr. 15, 1994. In this embodiment, the different audio tracks are fed into an audio mixer which aligns the different audio tracks in time. An analog inserter, such as that shown in FIG. 3 of U.S. patent application Ser. No. 08/228,355, attached to the output of the audio mixer, video source and computer, is then used to integrate the analog segments, 3D video and data codes.

Figure 4:
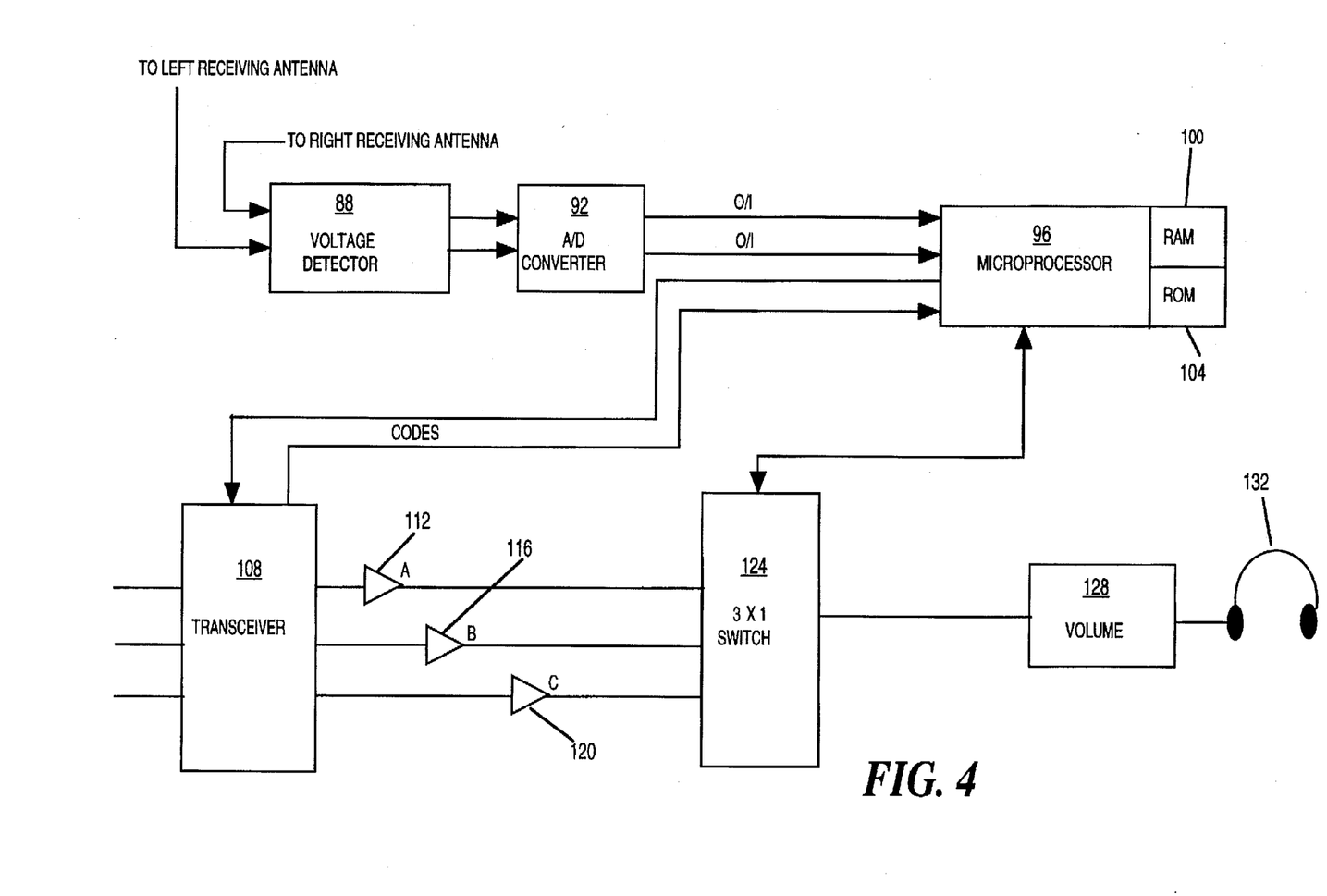
FIG. 4 is a diagram of the circuitry of the preferred embodiment for the user interface unit.

Alternatively, the 3D video, multiple alternative audio feedback signals and data codes can be digitally encoded, compressed and time division multiplexed by the configuration shown in FIG. 4 of U.S. patent application Ser. No. 08/228,355, for example.

Figure 2:
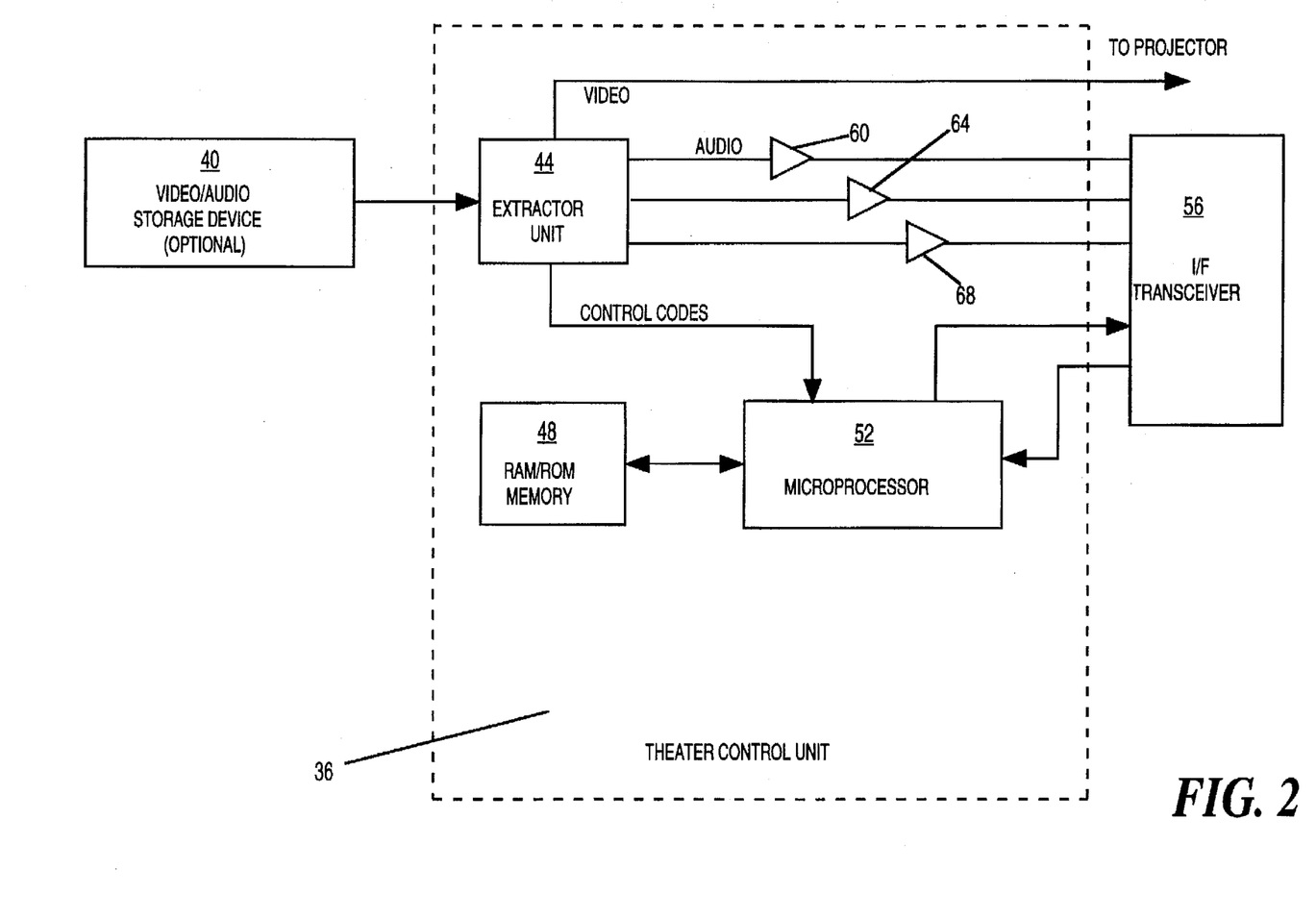
FIG. 2 is an electrical layout of the theater control unit.

C. Theater Control Unit The theater control unit 36, as shown in FIG. 2, is connected to and receives the 3D interactive presentation from the video/audio storage device 40. As shown in FIG. 2, the theater control unit 36 preferably comprises an extractor 44, a processor 52 with associated memory 48, and an interface 56 to user interface units 28.

In the preferred embodiment, the composite 3D program signal is read from the external storage device 40 and passed to the input of the extractor 44. The extractor 44 separates the composite presentation signal received from the storage device 40 into its three components; video, audio, and control data. If the composite 3D program signal is in analog format as described above, the analog 3D video signal(s) with the embedded audio and data codes either in the VBI or "black frame times" are read into an extractor unit 44 such as that disclosed in FIG. 6 of copending U.S. patent application Ser. No. 08/228,355. Alternatively, if the composite 3D program signal is in digital format, the digital composite signal is preferably read into the digital extractor circuitry shown in FIG. 7 of copending U.S. patent application Ser. No. 08/228,355 where the signals are decoded, demultiplexed and decompressed. However, the extractor unit 44 is not limited to these devices and could be any conventional means for separating or receiving the program elements from any storage format. In another embodiment, if the audio, video and data codes are stored separately on CD ROM (or other storage device), the extractor 44 is merely a pass-through box that receives and forwards the audio, video and data.

After these components are extracted they are distributed to various components. The video signal(s) is distributed to the 3D projectors 32. The audio signal is preferably buffered and distributed to an interface unit 56 such as an ethernet interface, IR interface or an RF interface, depending on the transmission media used for communications between the theater control unit 36 and the user interface units 28. The control data codes are sent to the processor 52.

The theater control unit processor 52, as shown in FIG. 2, processes the data from the extractor unit 44, stores and reads instructions from ROM/RAM memory 48, and transmits audio selection codes to the user interface units 28. The processor 52 is preferably a 80C188 based microcontroller, but can be any similar controller.

As mentioned above, an important function of the data codes is to align the appropriate audio responses in time and provide branching commands and algorithms to assist in determination of selecting a proper audio response. In the preferred embodiment, the control data is embedded in the visual portion of the movie itself (such as the "black frame times" if the presentation is a movie, or during the vertical blanking interval if a standard NTSC video format is used). Preferably, the theater control unit 36 passes on the branching commands to each user interface unit 28 via the same communications path on which the alternative audio feedback signals are sent to the user interface units 28. For example, a separate infrared signal or radio frequency channel can be added for the sole purpose of sending the data codes to the user interface units 28 from the theater control unit 36.

However, the video and audio timing synchronization may also be done in other ways. Another embodiment is to preprogram the control data into every user interface unit 28 and to send synch pulses from the theater control unit 36 to the user interface units 28. The synch pulses are used to insure the user interface units 28 are in perfect timing with the video presentation. The actual "data codes" (including the branching commands and algorithms) necessary for choosing between different audio feedback channels can be embedded in the user interface unit's EPROM or RAM memory 100 prior to presentation of the movie.

The theater control unit 36 connects with the user interface units 28 either by infrared (IR), radio frequency (RF) connection or by cable in a daisy chain configuration. If IR communications is employed, the theater control interface 56 is any standard IR interface device. If connection is by cable, the audio feedback signals and data codes are sent to the user interface units 28 via an RS 485 T/R device. If connection is by a RF path, the audio feedback channels and the data codes are sent to an RF modulator, transmitter and antenna combination, connected in series and to the theater control unit 36. Preferably, the theater control unit 36 sends to the user interface units 28 the set up commands and audio selection commands. In this embodiment, the user interface unit processors 96 will actually read and interpret the codes for selecting the proper and appropriate audio feedback response.

Although the theater control unit 36 has been described with respect to a movie theater environment, it's components could be integrated into a set top converter box, a personal computer or as a separate interactive program box connected to a television set or monitor in the home.

D. User Interface Units

As mentioned above, several times during the 3D video interactive program, each member of the audience will be prompted by an on-screen character to select one of two or more "floating" 3D choices. Each choice appears to be within "touching range" of each individual viewer, but in fact, is just an illusion based on the 3D effect. The viewer then can "physically" interact with the 3D presentation via a selection means by selecting one of the "floating" 3D choices either by looking at, or pointing towards, or reaching for the "floating" 3D object of choice. Each of these types of physical gestures for selecting the object of choice can be implemented by one of the selection means embodiments described below. After the members of the audience respond, the determining means uses the choice as input to determine the immediate selection of an audio feedback response that subtly alters the common audio through the branching to one of multiple audio channels that comprise the 3D presentation soundtrack. Each individual receives via their own user interface unit 28 by the presentation means only those audio feedback responses that are appropriate to the specific personal choice that has been made by the particular viewer.

Generally, each of the preferred embodiments of the user interface units 28 comprise a selecting means (comprising a means for interacting with the 3D presentation and a means for detecting the user choice), a means for determining the related audio feedback response, and a means for presenting the related audio response to each individual user.

Figure 3A:
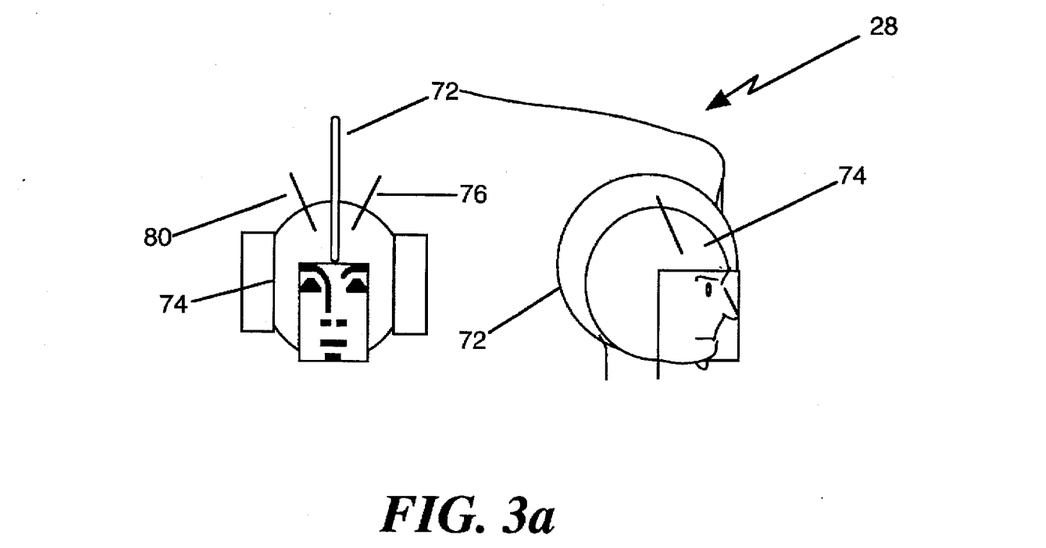
FIG. 3a is a drawing of one embodiment of the user interface unit

In one preferred embodiment, as shown in FIG. 3a, the user interface unit 28 comprises a helmet 74. This helmet 74 allows a viewer to make a selection by merely "looking" at a choice. This is accomplished by allowing a detecting means (i.e., a processor 96 connected to detection circuitry 88, 92), as shown in FIG. 4 and preferably attached to the inner surface of the helmet 74, to determine the orientation of the user's head with respect to the movie screen 20 using the inputs from an interacting means 74, 84. For example, assuming three 3D options, a viewer may simply look at the choice which appears to the left of the screen 20, at the choice in the middle of the screen 20, or at the choice at the right of the screen 20, and the microprocessor 96 in conjunction with the detection circuitry (i.e., the voltage detector 88 and A/D converter 92) can compute the choice being made by the user, as explained below.

The helmet configuration, as shown in FIG. 3a, has an interacting means comprising a partition 72 interposed between two antenna 76, 80 attached to the outer surface of the helmet 74. In addition, each user would preferably wear either 3D glasses or a 3D visor attached to the helmet 74 in order to view the three dimensional presentation. The antenna on the left side of the helmet is the first receiving antenna 76. Whereas, the antenna on the right side of the helmet is designated as the second receiving antenna 80. The partition 72 is attached to the middle of the helmet and runs from the front to the back, preferably spaced equally between the first and second receiving antennas 76, 80.

The helmet interacting means functions with the assistance of a reference beacon signal, preferably emanating from the front of the theater. An infrared or RF transmitter 24, as shown in FIG. 1, is preferably located at the front of the theater for providing a reference beacon signal for aiding in the determination of the user's physical selections. The reference beacon signal is preferably an infrared or RF signal capable of being received by each of the user interface units 28.

The reception characteristics of the reference beacon signal at a user interface unit 28 is used to determine the orientation of the head of the respective individual with respect to the 3D "floating" options. Once the orientation of the head is determined with respect to the 3D floating options, the user's selected choice can be determined by the detecting means.

Specifically, the determination of whether or not the reference beacon signal is occluded by the partition 72, and thus not received by the first receiving antenna 76 or second receiving antenna 80, is used to determine the orientation of the head. If the first receiving antenna 76 is not receiving the reference beacon signal due to blockage by the partition 72, but the second receiving antenna 80 is receiving the reference beacon signal, the head orientation is determined to be facing to the left. On the other hand, if the second receiving antenna 80 is not receiving the reference beacon signal due to blockage by the partition 72, but the first receiving antenna 76 is receiving the reference beacon signal, the head orientation is determined to be facing to the right. Finally, if both the first and second receiving antennas 76, 80 are receiving the reference beacon signal, the head is determined to be facing straight ahead. Therefore, the partition 72 must be at least large enough to obstruct the first receiving device 76 from the transmitter 24 located above the 3D screen 20 if the viewer turns their head to the left, and to obstruct the second receiving device 80 from the same transmitter 24 if the viewer turns their head to the right.

As shown in FIG. 4, the detecting means circuit preferably comprising the voltage detector 88, analog-to-digital (A/D) converter 92, and microprocessor 96 actually makes the determination of user head orientation after receiving inputs from interacting means comprising the first and second receiving antennas 76, 80, and consequently which of the corresponding three 3D images has been selected by the user. A conventional voltage detector 88 is connected to the output ports of both receiving antennas 76, 80. The voltage detector 80 determines the voltage level of each of the signals received from the first and second receiving antennas 76, 80. If one of the receivers is obstructed from receiving the reference beacon signal by the partition 72, a very weak signal will be received and the voltage detector 88 will read a low signal strength voltage corresponding to the obstructed antenna. If, however, the receiver is not obstructed by the partition 72 and receives the reference beacon signal, the voltage detector 88 will indicate a high signal strength in volts.

The voltage detector 88 forwards the measurements from each antenna to an A/D converter 92. The A/D converter 92 is preprogrammed with a reference voltage level to distinguish the signal strength levels considered to be high and the signal strengths considered to be low. For example, assume that the reference voltage level is set at 2.5 volts. Any signal strength above 2.5 volts will be converted by the A/D converter 92 into a logical 1, with any input below 2.5 volts converted into a logical 0. As a result, the output of the A/D converter 92 is a digital representation of the signal received via the receiving device based on whether or not that receiving device was obstructed.

These digital representations are sent to the processor 96. The processor 96 is preferably a 80C451 based microcontroller, but can be any similar processor. Based on the digital representations, the processor 96 determines whether the user was looking left, right, or straight ahead.

Based on the determined user selection, the determining means of the user interface unit 28 (comprising the processor 96 and switch 124) processes this selection and with the aid of unique audio selection codes, preferably received from the theater control unit 36, selects and presents to the particular user an individualized audio feedback response. In the preferred embodiment, branching between audio channels is preferably performed in the user interface unit 28. A branching algorithm, via the audio selection codes, is downloaded from the theater control unit 36 to each user interface unit 28. The user interface unit 36 reads the algorithmic codes and stores these codes in RAM memory 100. The processor 96 uses the algorithm to determine the proper audio channel to switch to as a function of the most current and/or previous user selections.

The circuitry in FIG. 4 is preferably enclosed in a small box attached to the outer back surface of the helmet 74. As shown in FIG. 4, the audio selection means comprises the ethernet cable connector interface, IR or RF receiver 108 for receiving the multiple audio feedback channels, the 3×1 switch 124 and the microprocessor 96. If more than three audio channels are provided, then an n×1 switch 124 is preferred, where n corresponds to the number of audio channels. The audio channels are amplified by buffer amps 112, 116, 120 which feed the 3×1 switch. The output of the switch 124 will be the appropriate audio feedback response which is input into an amplifier 128 with volume control and passed to the headphones 132, which are preferably attached to the inner surface of the helmet 74. However, the audio feedback response segments can alternatively be stored in memory 100 at the user interface unit 28 or in memory 48 at the theater control unit 36. If the audio feedback segments are stored in memory 100 at the user interface unit 28, the selected audio response is simply retrieved from memory 100 and passed to the amplifier 128. If, however, all of the audio feedback responses are stored in memory 48 at the theater control unit 36, the user interface unit processor 96 sends a command (with an ID code identifying the selected audio segment) back to the theater control unit 36 through the transceiver 108 and communications means. Upon receipt of the select audio command, the theater control unit processor 52 calls from memory 48 the audio response identified by the command, passes the response to the transceiver 56 which transmits the response to the particular user interface unit 28 for play to the user. In a multiple user environment, with several audio response signals forwarded to different user interface units, a header or code is required on each signal to identify to the appropriate user interface unit 28 which signal to lock onto and receive. These signals can be combined at the theater control unit 36 according to any conventional multiple access scheme such as CDMA, FDMA or TDMA.

As the 3D interactive program progresses, at various points, the members of the audience will be prompted by an on-screen character or person to choose one of two or more of the 3D "floating" images. As discussed above, the user may respond by looking at the 3D image of choice, or in alternative embodiments, as discussed below, the user may respond by reaching out towards or pointing a pointing device at the image. The three audio feedback tracks, preferably recorded in the on-screen character's own voice and lip synched to the mouth movements of the on-screen character, are sent from the theater control unit 36 to each of the user interface units 28, and in each user interface unit 28 specifically to the 3×1 switch 124. Now, as a result of the user choice, as determined by the detection means described above, the microprocessor 96 interprets the algorithmic codes in conjunction with the user choice and either directs the 3×1 switch 124 to branch to the proper audio feedback channel or retrieves from memory 100 the appropriate audio segment(s). In this manner, each member of the audience hears a different and personalized response in the on-screen character actor's own voice via the headphones 132. Therefore, a large audience in a movie theater and/or single participants at home can view the same movie screen 20 or display monitor 20, but carry on their own unique dialogue with the three dimensional interactive program.

In addition, or as part of the audio feedback response, audio sounds can be played to enhance the virtual reality effect of the 3D presentation. For example, after a user chooses a "fireball", a prerecorded sound of an explosion can be called from memory by the processor 96, or included as part of one of the audio channels, and be presented to the user to enhance the interactive effect.

In an alternative embodiment, instead of receiving the different audio feedback responses from the theater control unit 36, the audio feedback responses for an entire movie presentation can be stored in RAM or EPROM memory 100, 104 at each user interface unit. In this embodiment, preferably the data codes are still being sent from the theater control unit 36 to each of the user interface units 28. However, the data codes could also be stored in memory 100, 104 at each of the user interface units 28. When the user is prompted by the on-screen character to make a selection, the selection means determines the choice made by the user. The data codes are read from memory 100, 104 and based on these codes and the user choice, the processor 96 sends a command to RAM 100 and retrieves an appropriate stored audio feedback response. The audio feedback response is aligned with the video presentation, through use of the data codes, and is forwarded via the volume control amplifier 128 to the headphones 132 for presentation to the viewer.

In addition, all of the user choices made during a program by a user can be stored in the memory, preferably RAM 100, associated with the processor 96 in the user interface units 28. Later in the presentation (even after many other choices have been made), through the combination of memory and logic, the system remembers previous choices and at appropriate "trigger" points in the program, as signaled by the program data codes, the common audio associated with the 3D movie presentation is replaced with an appropriate audio response that relates to potentially several previous user selections. At the onset of a trigger point, the processor 96 will select one of several possible audio segments for presentation to the subscriber.

Each trigger point is identified preferably through the use of data codes sent from the theater control unit 36 to each of the user interface units 28. The codes preferably include, at a minimum, the following information: (1) a header identifying the occurrence of a trigger point; (2) audio selection time; (3) cross reference to the corresponding interrogatory message presented at the beginning of the show. The first bit in the sequence identifies to the processor 96 that a trigger point is about to occur. The second portion informs the processor 96 the time to select from memory 100 the appropriate audio feedback response.

Upon receipt of the codes by the user interface unit 28, the processor 96 reads and interprets the codes and calls from memory 100,104 one or more particular user selections designated by the trigger point codes. The user selections correspond to user selections to the series of interrogatory messages preferably presented at the beginning of the program. After obtaining the appropriate user selection(s), the processor 96 reads and performs the executable instructions using the user selections as inputs into the macro algorithm. The result of the algorithm is the selected audio feedback response. The audio feedback response can be called from memory 100 if it is prestored or the processor 96 can command the switch 124 to branch to the particular audio channel if the response is transmitted from the theater control unit 36. After the selected audio response is played to the user, the switch 124 branches back to the common audio.

The processor 96 commands the appropriate audio response to be forwarded to the volume control 128 and headphones 132. The description of "trigger points" is provided in U.S. patent application Ser. No. 08/289,499.

Based on this memory feature of the present invention, if the user selected eight choices during the movie, not only does the user receive audio feedback (as described above) each time a choice has been made, but, in addition, it can remember and utilize these choices to provide an instant recap at the end of the movie (e.g., "in this movie, you selected the lion, shark, and alligator; you must be interested in courageous and ferocious species"), as described in previous Freeman patents.

Furthermore, the entire collection of user responses, or a collection thereof, can be stored in memory 100 and later transmitted (preferably by infrared or RF transmission) from each user interface unit 28 back to the theater control unit 36. These responses can be tabulated, printed and/or analyzed by the theater control unit 36 to determine either individual or classroom performance. Since the theater control unit 36 can be a modified personal computer, it can easily interface with a printer via a printer port for the output of such performance indicators. This embodiment is especially attractive in an educational environment.

Alternatively, each user selection or compilation of user selections can be used by each user interface unit 28 to provide a visual indication of an individual's performance. For example, a light source could be attached to the helmet 74, connected to a battery pack and the processor 96, and when a user answers a question correctly, the processor 96 could send a signal to enable the light source to emit light. In this manner, every person in the audience could see which users answered correctly.

Figure 3B:
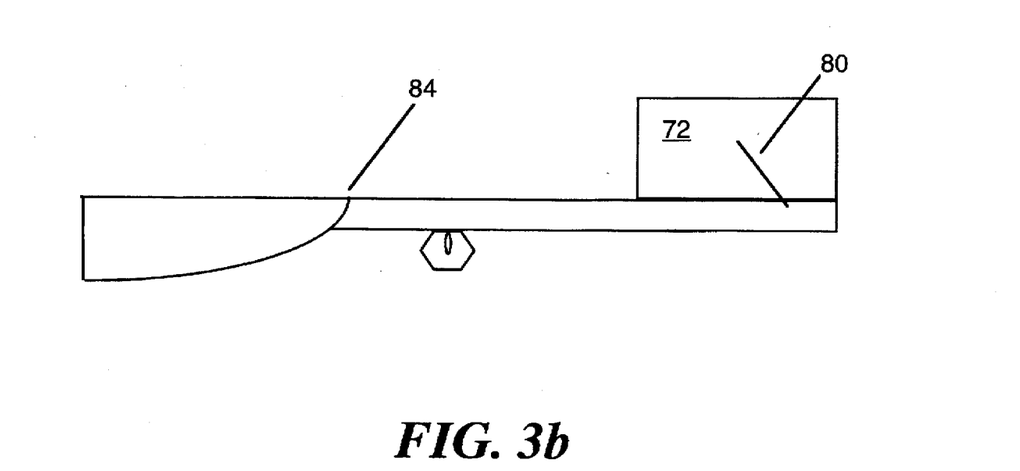
FIG. 3b is a drawing of an alternative user interface unit.

In another preferred embodiment, the user interface units' selection means can be a pointing device such as a wand or gun 84, as shown in FIG. 3b. Similar to the helmet 74, the gun or wand 84 comprises two antennas divided by a partition 72, one on each side. As an example, the user points the gun 84 at one of the three-dimensional objects. If the user points the gun 84 at the left image, positioned on the left side of the 3D screen 20, the first receiving antenna 76 is obstructed. If the user points the gun 84 to the right image, positioned on the right side of the 3D screen 20, the second receiving antenna 80 is obstructed. Alternatively, if the user points the gun at the image in the middle of the screen, neither of the receivers is occluded. Each of the antenna outputs feeds a box which preferably contains the identical selection means 88, 92, 96 and determining means circuitry 96, 124 shown in FIG. 4. Therefore, the means for interacting with the 3D presentation and detecting the user choice, the means for determining an appropriate audio feedback response, and the means for presenting the related audio response to each individual user are similar to that described above with respect to the helmet configuration.

Another handheld means for indicating user response is a keypad. The key pad technique allows the user to directly input their selections. The keypad will preferably comprise a number of function keys for entering user choices. Each function key is preferably connected to the microprocessor 96 by a serial line. In this embodiment, a user makes a selection by simply depressing one of the function keys. The keypad implements essentially the same circuit as shown in FIG. 4, except the voltage detector 88 and A/D converter 92 circuitry are replaced with the direct entry keypad. Again, communications to and from the theater control unit 36 would preferably occur either by ethernet cable, infrared or RF transmission.

Alternatively, the user interface unit 28 may comprise a device with a photo sensitive detector on one end. The photo sensitive device is designed to sense the color or shade of the object the handheld unit is directed towards on the 3D screen. In other words, the user points the handheld photo sensitive device at their selection, and the photo sensitive recognizes the color or shade of the particular selection. Of course, each of the projected 3D "floating" images must be differently colored or shaded in this embodiment. As an example, if the on-screen character or person asked the user to select between a large yellow giraffe and a large brown bear, the user would point the photo sensitive hand held unit at one of these two images which detects the color corresponding to their selection. More specifically, the photosensitive device receives the color and compares it to a color key which assigns it a value or symbol. This value is sent to processor 96 to determine the user's selection.

Another alternative embodiment is to provide each user with a device including handheld electrodes. These electrodes sense the user's physical movements in relation to the movie screen 20 and send these signals to a computer that analyzes the movements resulting in the determination of the particular selection. As an example, the viewer raises their right arm and points to their selection. These movements are detected via the electrodes and communicated to a personal computer. The computer processes these movements and compares them to the necessary movements to make such a selection. After the user's selection is identified, the selection is sent to the microprocessor 96 to direct the presentation of an audio feedback response, as discussed above.

Alternatively, the eye movements of a user could be used to discern between different selections. In one embodiment, one or more infrared transmitters could be strategically located at the front of the theater. Infrared sensors would be preferably attached at the front of a helmet with the sensors directed back toward one or both eyes. The direction of the user's gaze can be determined based on the reflection of the infrared signal off the retina of one or both eyes. For example, assume that two objects are displayed, one on the left side and one on the right side of the screen. The angle of receipt of the infrared signal at the sensors will vary depending on whether the user looks at the left image or the right image. Using processing algorithms well known in the art, the user interface unit processor 96 can determine the direction of viewing, and hence, which object was selected by the user.

Instead of using a single transmitter 24 at the front of the theater, as shown in FIG. 1 and described above, multiple transmitters and different signals can be utilized in the selection means. One example is using two transmitters that transmit signals with different frequencies, phases, or amplitudes, one located in the front of the room and the other in the back. The transmitter in the front of the theater sends a signal of frequency X, while the transmitter in the back sends a signal at another frequency, frequency Y. In this embodiment, the user may use the same helmet 74 or handheld device 84, shown in FIGS. 3a and 3b, for indicating user selections, but the detecting means is slightly different. The difference is that both the left and right receiving antennas 76, 80 always receive a signal from at least one of the transmitters. For example, if the user looks to the left, the first receiving antenna 76 is occluded from the transmitter at the front of the theater, but exposed to the transmitter in the back and thereby receives the signal of frequency Y. In contrast, the second receiving antenna 80 is occluded from the transmitter in the back of the theater, but exposed to the transmitter in the front, and thereby receives the signal of frequency X. Similarly, if the user looks to the right, the second receiving antenna 80 receives a signal of frequency Y, and the first receiving antenna 76 receives a signal of frequency X. If the user looks straight ahead, both receiving antennas 76, 80 receive two signals of frequencies X and Y.

To determine the 3D object selected, the signal(s) received at each antenna is passed to one of two noncoherent detection receivers. Each receiver is comprised of one bandpass filter centered on frequency Y connected in serial with an envelope detector and another bandpass filter centered on frequency X connected in serial with an envelope detector. The output of each filter/detector pair is passed to a conventional decision circuit. The decision circuit determines which signals are received by each antenna. By converting the received outputs into binary 1's and 0's, a four digit binary representation of the user's response is created and forwarded to the microprocessor 96. These four digits are used by the microprocessor 96 to represent whether the user looked left, right, or straight ahead.

While FIG. 1 shows a preferred embodiment of the present invention in an interactive movie theater, the present invention is not constrained to such an environment. In alternative embodiments, a conventional TV broadcast, cable television, wireless network, or satellite system could be used as the source of the 3D interactive programming in accordance with the present invention. The 3D interactive presentation could be transmitted in either digital or analog formats.

For example, the 3D interactive presentation program could be packaged as described in the U.S. application Ser. No. 08/289,499, preferably with the alternative feedback audio segments inserted into the vertical blanking interval of one of the 3D video signals, if more than one signal is required, or if these signals are digitally encoded then compressed and time division multiplexed with the video and data, as described in the aforementioned application. In these embodiments, each home or other reception center includes: a conventional PC or interactive program box that implements the circuitry and functions of the theater control unit 36, but also includes one or more RF demodulators, error correctors and demultiplexers, extractors (for extracting the audio channels), a switch (if branching occurs not in the user interface unit but in the PC or interactive program box), with these separate components preferably connected together in one of the embodiments as shown in FIGS. 3–6 of U.S. application Ser. No. 08/289,499; an infrared transmitter, connected to the PC or interactive program box, that would provide a reference beacon signal for aiding in the determination of the users' physical selections, as described above; one or more user interface units 28 that connect to the PC or interactive program box for allowing for user selection; and projection equipment and monitor, computer or advanced television capable of presenting the 3D video presentation.

Although, the present invention has been described with respect to embodiments for delivering audio interactivity, the present invention could also be used to provide video interactivity. In a 3D video arcade environment, for example, when a user reaches out, or points with a pointing device at the 3D object selected using one of the selection means described above, the video object could be altered to change to a different object, become a different color, or rotate in motion, for example.

In this interactive video embodiment, the user interface unit 28 determines the user selection, as described above, but this selection must now be transmitted back to the theater control unit 36. The theater control unit 36 preferably includes a video selector for branching from one video stream to another video stream based on the user selection. In this embodiment, several 3D video streams, related in time and content to one another, are preferably sent from the video/audio storage device 40 to the theater control unit 36. These video streams could be in analog format or in digital format. The video/audio storage device 40 may be any conventional source capable of providing synchronized 3D multiple video segments, such as a multitrack tape, CD ROM, or a plurality of separate tapes or video discs whose operation is synchronized. Each of the different video segments are preferably related in real time and content to one another. The alternative video segments are preferably sent from the storage device 40 to the control unit 36 where they are forwarded to the input of the video selector.

Upon receipt of the user's selection from the user interface unit 28, the theater control unit processor 52 interprets the data codes and sends a command to the video selector to branch to the channel containing the appropriate video stream. If the video signals are digitally compressed and multiplexed together, the video selector is preferably a video demultiplexer/decompressor. Alternatively, if the video signals are analog and frequency multiplexed, the video selector is preferably a frequency demultiplexer. The selected 3D video stream is then forwarded from the control unit to the video projection equipment for projection onto the screen 20. In this manner, a user may choose a 3D object such as a "fireball", for example, whereupon the image of the fireball may change to show an exploding fireball. Audio interactivity, as described above, can be combined and synchronized with the video interactivity through the use of the data codes to substantially enhance the realism of the 3D presentation.

Instead of receiving several video streams, the theater control unit 36 could simply call from storage the selected video stream. In this manner, the theater control unit processor 52 determines the desired video segment. The processor 52 then reads from some storage device (e.g., CD ROM) the appropriate video segment, buffers the signal to obtain time sync, and sends the 3D video segment to the projection means 32. Near the end of the selected video segment, the theater control unit 36 switches back to the common 3D video presentation.

As discussed above with respect to providing audio interactivity, the theater control unit memory 48 and processor 52 is preferably utilized for storing and processing prior user selections for controlling future video selection. The algorithm for controlling this selection is either embedded into the data codes or exists in software stored in memory 48.

Using the foregoing embodiments, methods and processes, the 3D video presentation system of the present invention maximizes the user's involvement and interactivity in a real time and low cost environment. Although the present invention has been described in detail with respect to certain embodiments and examples, variations and modifications exist which are within the scope of the present invention as defined in the following claims.

I claim:

1. An interactive video system for presenting a three dimensional video presentation, comprising:

a means for displaying a three dimensional video presentation, the presentation comprising a common audio and, at predetermined times, at least two selectable three dimensional video image options;

a means for selecting one of the three dimensional video image options;

a means, connected to the selecting means, for determining an appropriate audio feedback response, the audio feedback response chosen based on the selected three dimensional video image option; and a means, connected to the determining means, for presenting the appropriate audio feedback response to a user, wherein the appropriate audio feedback response results in audio which is personalized to the individual user.

2. The interactive video system of claim 1, wherein the selecting means comprises:

a means for interacting with the three dimensional video presentation, the interacting means having an output, wherein the user is prompted to interact with the three dimensional video presentation and the user interactively responds by selecting a three dimensional video image option; and a means, receiving one or more signals from the output of the interacting means, for detecting the three dimensional video image option pertaining to the user's interactive response.

3. The interactive video system of claim 2, wherein the interacting means comprises:

a transmitter, located at the front of a movie theater, for emitting a reference beacon signal;

a helmet, having an inner surface and an outer surface, comprising:

a partition, connected to the helmet, protruding from the center of the helmet outer surface;

a first receiving device, connected to the helmet, extending outward from the helmet outer surface and to the left of the partition, wherein the first receiving device produces a detectable output signal when the first receiving device receives the reference beacon signal unobstructed from the transmitter, the receipt of the reference beacon signal being a function of the viewer head orientation;

a second receiving device, connected to the helmet, extending outward from the helmet outer surface and to the right of the partition, wherein the second receiving device produces a detectable output signal when the second receiving device receives the reference beacon signal unobstructed from the transmitter, and wherein the second receiving devices presents no output signal when no reference beacon signal is received due to blockage of the reference beacon signal by the partition.

4. The interactive video system of claim 2, wherein the interacting means comprises:

a transmitter, located at the front of a movie theater, for emitting a reference beacon signal;

a pointing device, the pointing device having a connecting surface, comprising:

a partition, attached to the connecting surface, protruding from the center of the connecting surface;

a first receiving device, connected to the connecting surface, extending outward from the connecting surface and to the left of the partition, wherein the first receiving device produces a detectable output signal when the first receiving device receives the reference beacon signal unobstructed from the transmitter, the receipt of the reference beacon signal being a function of the direction of the pointing device; and a second receiving device, connected to the connecting surface, extending outward from the connecting surface and to the right of the partition, wherein the second receiving device produces a detectable output signal when the second receiving device receives the reference beacon signal unobstructed from the transmitter, and wherein the second receiving devices presents no output signal when no reference beacon signal is received due to blockage of the reference beacon signal by the partition.

5. The interactive video system of claim 2, wherein the detecting means comprises:

a means, receiving one or more signals from the output of the interacting means, for measuring the voltage associated with the signals;

a means, connected to the voltage measuring means, for converting the voltages to digital values;

a means, connected to the converting means, for processing the digital values to determine the selected three dimensional video image option.

6. An interactive theater video system for presenting a three dimensional video presentation, comprising:

a means for displaying a three dimensional video presentation, comprising a common audio and, at predetermined times, at least one three dimensional video image option;

a means for selecting one of at least two selectable three dimensional video image options, comprising:

a means for interacting with the three dimensional video presentation, the interacting means having an output, wherein a user is prompted to interact with the three dimensional video presentation and the user interactively responds by picking a three dimensional image option; and a means, connected to and receiving signals from the output of the interacting means, for detecting the three dimensional image option pertaining to the user's interactive response;

a means, connected to the selection means, for determining an appropriate audio feedback response, the audio feedback response chosen based on the selected three dimensional video image option; and a means, connected to the determining means, for presenting the appropriate audio feedback response to the viewer, wherein the appropriate audio feedback response results in an alteration from the common audio which is personalized to the individual user.

7. The interactive video system of claim 3, wherein the selecting means comprises:

a means, connected to the first and second receiving devices, for sensing the orientation of the user's head in relation to the selected three dimensional video image option, wherein head orientation is determined based on the output of the first and second receiving devices, the head orientation indicated as being towards the left of the center of the theater when the second receiving device presents the detectable output signal and the first receiving means presents no output signal, the head orientation indicated as being directed towards the center of the theater when the first and second receiving devices present the detectable output signals, and the head orientation indicated as being to the right of the center of the theater when the first receiving device presents the detectable output signal and the second receiving device presents no output signal.

8. The interactive video system of claim 4, wherein the selecting means comprises:

a means, connected to the first and second receiving devices, for sensing the orientation of the user's head in relation to the selected three dimensional video image option, wherein head orientation is determined based on the output of the first and second receiving devices, the head orientation indicated as being towards the left of the center of the theater when the second receiving device presents the detectable output signal and the first receiving means presents no output signal, the head orientation indicated as being directed towards the center of the theater when the first and second receiving devices present the detectable output signals, and the head orientation indicated as being to the right of the center of the theater when the first receiving device presents the detectable output signal and the second receiving device presents no output signal.

9. A user interface unit for responding to a three dimensional video presentation, the presentation comprising a common audio and, at predetermined times, at least two three dimensional video image options, comprising:

a means for selecting one of at least two three dimensional video image options, comprising:

a means for interacting with the three dimensional video presentation, the interacting means having an output, wherein a user is prompted to interact with the three dimensional video presentation and the user interactively responds by picking a three dimensional video image option; and a means, connected to and receiving signals from the output of the interacting means, for detecting the three dimensional video image option pertaining to the user's interactive response;

a means, connected to the selecting means, for determining an appropriate audio feedback response, the audio feedback response chosen based on the selected three dimensional video image option; and a means, connected to the determining means, for presenting the appropriate audio feedback response to the user, wherein the appropriate audio feedback response results in an alteration from the common audio which is personalized to the individual user.

10. An interactive video system using three dimensional images in a movie theater type environment wherein individualized audio interactivity is provided in conjunction with presentations of the three dimensional image, comprising:

an infrared transmitter, located at the front of a movie theater, for transmitting an identification signal;

a means, located at the front of the movie theater, for presenting more three dimensional images;

at least one helmet having an outer and inner surface, comprising:

a partition, connected to the helmet, protruding from the center of the helmet outer surface;

a first receiving device, connected to the helmet, extending outward from the helmet outer surface on the left side of the partition, wherein the first receiving device presents an output signal when the first receiving device receives the identification signal unobstructed from the infrared transmitter and the first receiving device presents no output signal when no identification signal is received due to blockage of the identification signal by the partition;

a second receiving device, connected to the helmet, extending outward from the helmet outer surface on the right side of the partition, wherein the second receiving device presents an output signal when the second receiving device receives the identification signal unobstructed from the infrared transmitter and the second receiving device presents no output signal when no identification signal is received due to blockage of the identification signal by the partition;

a means, connected to the first and second receiving devices, for sensing the orientation of a user's head in relation to the presenting means, wherein head orientation is determined based on the output of the first and second receiving devices, the head orientation indicated as being towards the left of the center of the theater when the second receiving device presents an output signal and the first receiving device presents no output signal, the head orientation indicated as being directed towards the center of the theater when the first and second receiving devices present the detectable output signals, and the head orientation indicated as being to the right of the center of the theater when the first receiving device presents an output signal and the second receiving device presents no output signal;

a means for receiving a plurality of separate audio channels;

a means, connected to the receiving means, for selecting between the separate audio channels based on the direction of the head orientation; and a means for presenting the selected audio channel to the user.

11. An interactive video method for presenting a three dimensional video presentation, comprising:

displaying a three dimensional video presentation, comprising a common audio and, at predetermined times, at least two selectable three dimensional video image options;

selecting one of the three dimensional video image options;

determining an appropriate audio feedback response, the audio feedback response chosen based on the selected three dimensional video image option; and presenting the appropriate audio feedback response to the user, wherein the appropriate audio feedback response results in audio which is personalized to the individual user.

* * * * *